United States Patent [19]
Ruger

[11] 3,813,111
[45] May 28, 1974

[54] BUMPER CONSTRUCTION FOR SHOPPING CART

[75] Inventor: Verlyn C. Ruger, Bellevue, Mich.

[73] Assignee: Roblin Industries, Inc., Battle Creek, Mich.

[22] Filed: Aug. 16, 1972

[21] Appl. No.: 280,985

[52] U.S. Cl....... 280/33.99 R, 280/33.99 A, 293/60
[51] Int. Cl............................................ B62b 11/00
[58] Field of Search 280/33.99 F, 33.99 H, 33.99 R, 280/33.99 C, 33.99 B, 33.99 S, 33.99 T, 33.99 A; 186/1 AC; 293/60

[56] References Cited
UNITED STATES PATENTS

| | | | |
|---|---|---|---|
| 2,605,116 | 7/1952 | Alexander | 280/33.99 H |
| 2,764,419 | 9/1956 | Enders | 280/33.99 S |
| 3,027,174 | 3/1962 | Garbarino | 280/33.99 H |
| 3,112,934 | 12/1963 | Buczak | 280/33.99 R |
| 3,174,768 | 3/1965 | Sanders et al | 280/33.99 C |
| 3,353,836 | 11/1967 | Davis | 280/33.99 S |
| 3,503,622 | 3/1970 | Romero | 280/33.99 F |

Primary Examiner—Kenneth H. Betts
Assistant Examiner—David M. Mitchell
Attorney, Agent, or Firm—Woodhams, Blanchard & Flynn

[57] ABSTRACT

A bumper system for a nestable shopping cart of the type having a wheeled lower frame, members upstanding from the lower frame near the rear end thereof, an upper frame carried by the upstanding members, a handle above and near the rear of the upper frame and a receptacle on the upper frame, the receptacle including a forward portion upwardly and rearwardly pivotable for nesting so that its bottom wall faces forwardly in opposition to the handle of a further similar cart nested in front thereof. The bumper system includes a transverse rear bumper member behind the rearmost of the upstanding members. A front bumper member is spaced forwardly of the upstanding members and has a pair of upstanding legs in forwardly spaced, overlapping relation with the rear bumper member. The spacing of the legs from the rear bumper member exceeds the horizontal spacing of the cart handle from the forwardly facing bottom wall of the receptacle portion positioned for nesting, so that nesting movement of the cart with respect to a further similar cart positioned in front thereof is stopped by contact between the opposed bumper members of the two carts and contact between the handle of the forwardly positioned cart with the forwardly facing bottom wall of the rearwardly positioned cart is prevented so as to avoid damage to such handle.

10 Claims, 4 Drawing Figures

PATENTED MAY 28 1974  3,813,111
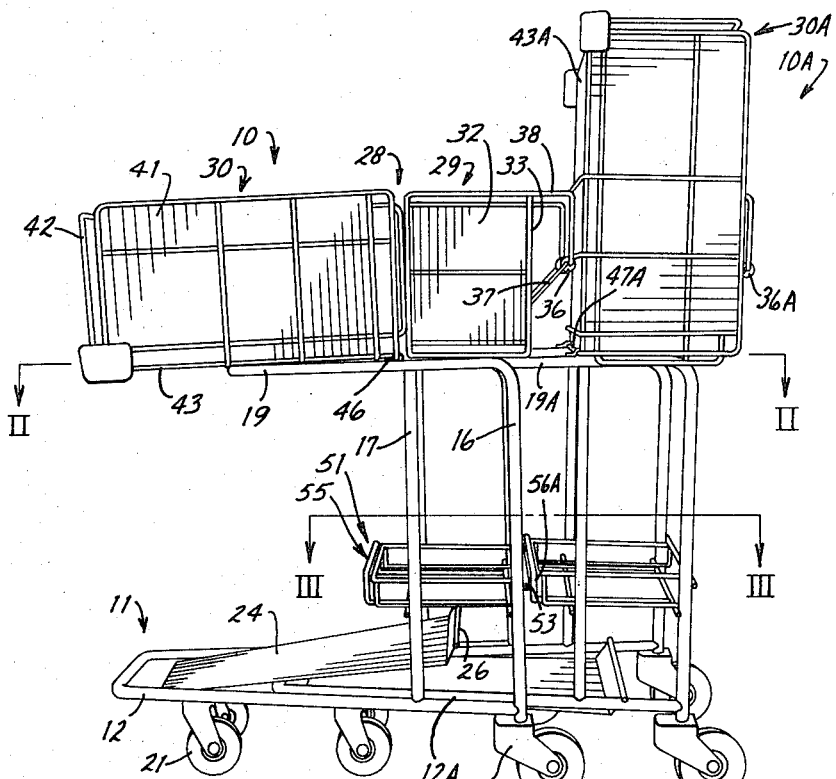
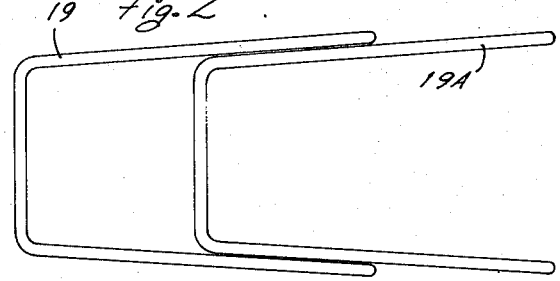
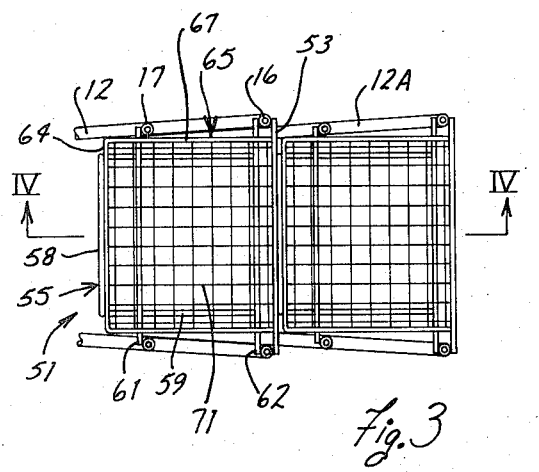
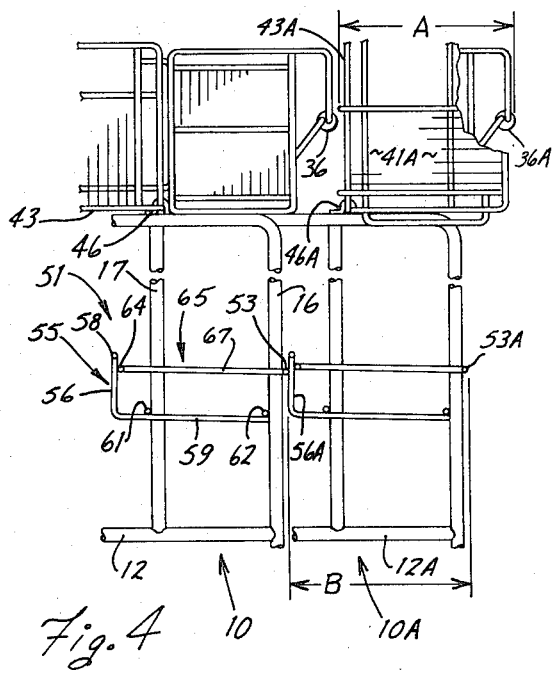

BUMPER CONSTRUCTION FOR SHOPPING CART

FIELD OF THE INVENTION

This invention relates to a bumper system for nestable shopping carts and more particularly relates to such bumper system for shopping carts of the kind having a rearwardly facing handle and a receptacle which in nesting condition has a forwardly facing wall portion opposed to such handle.

BACKGROUND OF THE INVENTION

It has long been known to provide shopping carts, for use for example by customers in supermarkets, that are nestable for storage. Typically, nesting for storage is carried out by moving one cart forwardly into nesting relation with the rear of another cart. In this way, a plurality of carts can be stored on a much smaller floor area than would be required by such carts in an unnested condition.

Although a variety of nestable shopping cart configurations have long been known, one particularly advantageous configuration utilizes an upper, primary receptacle, or goods receiving basket, which is substantially rectangular in plan, having a relatively large goods carrying area for carrying a large volume of goods without being of inconvenient depth. To achieve nesting, the forward, major portion of the basket, comprising a front wall, substantially parallel, spaced side wall portions and a bottom wall portion, is pivotally mounted at the rear edge of the bottom wall portion on the cart frame for pivotal movement from a goods carrying position, wherein the bottom wall is substantially horizontal, upwardly and rearwardly to a nesting position, wherein the forward receptacle portion surrounds the rear portion of such receptacle and extends upwardly therefrom, with the bottom wall portion thereof facing forwardly. In carts of this kind, a handle, manually engageable by the cart operator, is fixed to the rear receptacle portion and is spaced rearwardly therefrom. An example of carts of this kind is disclosed in U. S. Pat. No. 3,503,622 to Romero.

A disadvantage of carts of this general type has been that when a pair of such carts are nested, forward movement of the rear cart is terminated by contact of the upstanding bottom wall of the pivotable main or forward receptacle portion thereof with the rearwardly displaced handle of the forward cart. Such handles are generally constructed, in common with handles of long known carts of a variety of types, with a plastic hand engageable portion on which normally appears certain indicia, typically the name of the supermarket or the like in which the cart is to be used. Such handle constructions have been and continue to be very popular with shopping cart purchasers, such as supermarkets, in that they provide not only a comfortable and efficient handle by which the customer may engage and propel the cart, but also identify the supermarket thereby providing advertising and cart identification, in the event that the cart is taken from the supermarket premises. Unfortunately, it has been found that after one or more nesting operations wherein such handle is struck by the forwardly facing bottom wall of the upstanding major receptacle portion of another similar cart, the handle will often become damaged. Thus, the handle may become cracked or have portions thereof knocked off and thereby become at least relatively unsightly and aesthetically unpleasing to market customers or, if the damage is more severe, may result in sharply broken edges and/or impairment of the identifying or advertising indicia thereon. Thus, the supermarket owner or operator is faced with a choice between relatively frequent, expensive and time-consuming handle repair and replacement operations on the one hand, or continued operation of carts with damaged handles, to the displeasure of his customers.

Thus, the objects of this invention include provision of:

1. A bumper system for a shopping cart of the type described which will prevent damage to the cart handle as a result of nesting.

2. A bumper system for a shopping cart, as aforesaid, which prevents positively contact between the cart handle of a forward cart and a forwardly facing bottom wall portion of another, rearwardly displaced cart moving forwardly into nesting relation therewith.

3. A bumper system for a shopping cart, as aforesaid, which includes, in fixed location on upstanding members of the frame system of each cart, a forward bumper member and a rearward bumper member, such bumper members being spaced from each other sufficiently that the rearward bumper member of a given cart will be engaged by and stop forward movement of the forward bumper member of a rearwardly displaced cart moving into nesting relation therewith before the handle of the forward cart is contacted by portions of the rearward cart.

4. A bumper system for a shopping cart, as aforesaid, in which said forward and rearward bumper members define in part a secondary, or auxiliary, goods carrying receptacle spaced below the primary goods receptacle of the cart, particularly adapted for receiving specialized articles in a convenient manner, for example for receiving the purse of a customer operating the cart, and arranged on the cart in such a way as to enhance the overall goods carrying capacity of the cart and not to impair the operation of the cart by a customer or the like.

5. A bumper system for a shopping cart, as aforesaid, which enables carts equipped therewith to be nested rapidly and with substantial force without damage thereto and which substantially eliminates damage to cart handles during nesting operations.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a pictorial view substantially in side elevation showing a pair of carts embodying the invention in nested relation.

FIG. 2 is an enlarged, fragmentary sectional view substantially taken on the line II—II of FIG. 1.

FIG. 3 is an enlarged, fragmentary sectional view substantially taken on the line III—III of FIG. 1.

FIG. 4 is a fragmentary sectional view substantially taken on the line IV—IV of FIG. 3.

Certain terminology will be used in the following description for convenience in reference only and will not be limiting. The words "up," "down," "right" and "left" will designate directions in the drawings to which reference is made. The words "front" and "rear" will refer to the leftward and rightward ends of the apparatus disclosed, as oriented in FIGS. 1–4. The words "in"

and "out" will refer to directions toward and away from, respectively, the geometric center of the apparatus disclosed and designated parts thereof. Such terminology will include derivatives and words of similar import.

SUMMARY OF THE INVENTION

The objects and purposes of the invention are met by providing a bumper system for a nestable shopping cart of the type having a wheeled lower frame, members upstanding from the lower frame near the rear end thereof, an upper frame carried by the upstanding members, a handle above and near the rear of the upper frame and a receptacle on the upper frame, the receptacle including a forward portion upwardly and rearwardly pivotable for nesting in a manner to cause the bottom wall of the forward receptacle portion to face forwardly in opposition to the handle of a further similar cart nested in front thereof. The bumper system includes a transverse rear bumper member behind the rearmost of the upstanding members. A front bumper member is spaced forwardly of the upstanding members and has a pair of upstanding legs in forwardly spaced, overlapping relation with the rear bumper member. The spacing of the legs from the rear bumper member exceeds the horizontal spacing of the cart handle from the forwardly facing bottom wall of the receptacle portion positioned for nesting so that nesting movement of the cart with respect to a further similar cart positioned in front thereof is stopped by contact between the opposed bumper members of the two carts and contact between the handle of the forwardly positioned cart with the forwardly facing bottom wall of the rearwardly positioned cart is prevented so as to avoid damage to such handle.

DETAILED DESCRIPTION

FIG. 1 discloses a pair of preferably identical shopping carts 10 and 10A in nested relation with each other. Portions of the rearward cart 10A corresponding to similar portions of the forward cart 10 will be referred to by the same reference numerals thereas with the suffix "A" added thereto.

The cart 10 includes a frame system 11 comprising a forwardly tapered generally U-shaped lower frame 12. Transversely spaced rear upstanding members 16 extend upwardly from the rear end of the lower frame 12. Transversely spaced forward upstanding members 17 extend upwardly from the lower frame 12 forwardly of and substantially paralleling the rear upstanding members 16. The separation of the members 17 is somewhat less than that of the members 16 due to the forward taper of the lower frame 12. A substantially horizontal, U-shaped and forwardly tapered upper frame 19 extends forwardly from the upper end of the rear upstanding members 16 and in the particular embodiment shown is an integral continuation thereof. The upper ends of the forward upstanding members 17 fixedly engage and support the upper frame 19 intermediate its forward and rearward ends. The open rear ends of the lower frame 12 and upper frame 19 are adapted to receive partially therewithin, for nesting, the corresponding lower and upper frames 12A and 19A of the rearward cart 10A, in the manner shown in FIGS. 1–4. The upper frame 19 is preferably shorter than the lower frame 12 and extends a lesser distance forwardly from the upstanding members 16 and 17.

The frame system 11 is movably carried by a pair of pivotable, transversely spaced forward casters 21 secured to the lower frame 12 near the forward end thereof and by a pair of preferably fixed and transversely spaced casters 22 located at the rear end of the lower frame 12 and, in the particular embodiment shown, fixed to the lower ends of the rearward upstanding members 16. The frame system 11 in the particular embodiment shown is of welded tubular steel construction.

If desired, the lower frame 12 may be provided with an elongate goods carrying shelf 24 disposed intermediate the ends thereof and pivotally secured at its forward end to the lower frame 12 in a manner that its rearward end will pivotally rise somewhat upon being contacted by the front end of the lower frame 12A of the rearward cart 10A during nesting. When not in a nesting condition, the rear end of the shelf 24 is supported atop the lower frame 12 by a suitable cross bar 26 adjacent the rear end thereof.

A primary, upwardly opening goods receptacle 28 is carried atop the upper frame 19 and extends forwardly and in the particular embodiment shown, somewhat rearwardly therefrom. The primary receptacle 28 includes a rear portion 29 and a larger forward portion 38 extending forwardly therefrom at a location substantially above the forward upright members 17. The rear receptacle portion 29 includes side walls 32, a rear wall 33 and a bottom wall, not shown, which is fixed to the upper frame 19 in the area between the forward and rearward upright members 17 and 16. A transverse handle 36 is displaced rearwardly from the rear wall 33 and is with respect to the rear receptacle portion 29 at each end, here by an upwardly and rearwardly angled lower rod 37 and the depending portion of a generally L-shaped upper rod 38, here comprising an extended portion of the upper perimeter element of the corresponding side wall 32.

The forward primary receptacle portion 30 includes a pair of upstanding side walls 41, a forward end wall 42 and a bottom wall 43. If desired, the front end wall 42 may be arranged as a downwardly and forwardly pivotable gate. The receptacle portion 30 extends forwardly beyond the front end of the upper frame 19 in cantilevered relation therewith. The receptacle portion 30 is pivotally mounted at the rearward end of its bottom wall 43, intermediate the ends of the upper frame 19, for upward and rearward pivotal movement through about a 90° arc from its goods carrying, or use position, shown to an upstanding nesting position indicated at 30A with respect to the rear cart 10A. The side walls 41 of the forward receptacle portion 30 are spaced somewhat outboard of the side walls 32 of the rear receptacle portion 29 to accommodate such pivotal movement without interference therebetween. The pivot mounting for the forward receptacle portion 30 includes pivot brackets 46 fixed on the upper frame 19 and coacting with a transverse perimeter member of the bottom wall 43 of the forward receptacle portion 30. A corresponding transverse perimeter member is indicated at 47A in connection with cart 10A.

Turning now to portions of the disclosed apparatus more closely relating to the present invention, the cart 10 is provided with a bumper system 51 fixedly carried by intermediate portions of the upstanding members 16 and 17 near the lower ends thereof. The bumper system 51 (FIGS. 3 and 4) includes a rodlike rear bumper member 53 which extends transversely between the rear upstanding members 16 and is fixed, preferably by welding, to the rear faces thereof. A front bumper member 55 comprises a pair of transversely spaced, substantially upstanding legs 56, which are spaced forwardly from and vertically overlap, i.e. extend above and below, the rear bumper member 53. As shown with respect to cart 10A, (FIG. 4) the spacing B of the legs 56A from the rear bumper member 53A exceeds, at least by a small margin, the spacing A of the receptacle bottom wall 43A from the cart handle 36A, for purposes appearing hereinafter.

The legs 56 are offset forwardly from the forward upstanding members 17 of the cart frame system and are located somewhat inboard therefrom. The front bumper member 55 further includes a bight 58 extending transversely between and connecting the upper ends of the legs 56 and a pair of extensions 59 which extend rearwardly, substantially horizontally from the bottoms of the corresponding legs 56 to points near the rear upstanding members 16. The front bumper member 55 is fixedly supported on the cart 10 by a pair of transverse rods 61 and 62 which extend between the upstanding members 17 and between the upstanding members 16, respectively, and are secured thereto and to the upper faces of the extensions 59, which they cross, preferably by welding. The transverse central portion 64 of a substantially U-shaped brace 65 is fixed, preferably by welding, to the rearward faces of the legs 56 near but spaced below the bight 58. The arms 67 of such brace extend substantially rearwardly from the ends of the central portion 64 into fixed, preferably welded, contact with the rear bumper member 53 adjacent the ends thereof. The rear bumper member 53, front bumper member 55, rod 61 and 62 and brace 65 are all preferably of steel rod and welded together.

In the preferred embodiment shown, the elements above-described of the bumper system 51 are used to form the supporting framework for an upwardly opening secondary receptacle for goods, such secondary receptacle being completed by provision of a substantially rectilinear, upwardly opening basket, preferably of welded transverse and longitudinal wires 71 resting on and fixed to the rods 61 and 62 to form a bottom wall. The wires 71 have upturned ends extending upwardly to and fixed to the brace arms 67 to define upstanding side walls, extending upwardly to the brace central portion 64 to define a front wall and extending upwardly to the rear bumper member 53 to define a rear upstanding wall. The wires 71 are preferably welded to said rods 61 and 62, said brace arms 67, said brace central portion 64 and said rear bumper member 53 to define a rigid unitary basketlike secondary receptacle.

In operation, the bumper system 51, when provided with wires 71 to form a secondary receptacle as above-discussed, can be utilized to carry articles in addition to those carried by the primary receptacle 28 and shelf 24, as a shopper using the cart moves from place to place through a supermarket or the like collecting goods to purchase.

When the carts 10 and 10A are empty, the cart 10A can be nested in the rear of the cart 10 by forward movement toward and into adjacency with the rear end of the cart 10 to assume the position shown in FIGS. 1-4. Since the dimension B (FIG. 4) exceeds the dimension A as above-discussed, the bumper legs 56A of the rearward cart 10A will contact the rear face of the rear bumper member 53 of the forward cart 10 before any portion, particularly the upstanding bottom wall 43A, of the rear cart 10A contacts the handle 36 of the forward cart 10. Such contact between the bumper members 53 and 56A positively prevents further nesting movement of the rear cart 10A into the forward cart 10. In this manner, damage to the handle 36 of the forward cart 10 by the bottom wall 43A of rearward cart 10A is positively precluded.

Although a particular preferred embodiment of the invention has been disclosed in detail for illustrative purposes, it will be recognized that variations and modifications of the disclosed apparatus, including the rearrangement of parts, lie within the scope of the present invention.

The embodiments of the invention in which an exclusive property or privilege is claimed are defined as follows:

1. In a nestable shopping cart of the type having a wheeled lower frame, members upstanding from said frame near the rear end thereof, an upper frame carried by said upstanding members, a fixed manually engageable handle above and near the rear of said upper frame and a receptacle on said upper frame and including a forward portion upwardly and rearwardly pivotable for nesting to cause the bottom wall of said forward receptacle portion to face forwardly in horizontal opposition to the handle of a further similar cart nested in front thereof, the improvement positively preventing contact between said receptacle with the handle of said further cart and comprising in combination:
a fixed rear bumper member behind the rearmost of said upstanding members and extending transversely thereof substantially the width of said cart, said rear bumper member being disposed vertically between said lower and upper frames;
a fixed front bumper member spaced forwardly of and supported from said upstanding members and having a pair of upstanding legs, said legs each having a portion forwardly spaced from and extending above and below said rear bumper member, said spacing of said legs and rear bumper member exceeding the horizontal spacing of the cart handle from forwardly facing bottom wall of said receptacle portion positioned for nesting;
whereby upon nesting of said cart with said further similar cart, the front bumper member of said cart will contact the rear bumper member of said further similar cart to positively prevent further nesting movement while the forwardly facing bottom wall of said cart remains spaced rearwardly from and out of contact with the handle of said further similar cart.

2. The apparatus of claim 1 including an upwardly opening secondary receptacle fixed to and extending between said upstanding members for connecting same together intermediate said lower and upper frames, the secondary receptacle including forward and rearward walls respectively including said legs and said rear bumper member, said secondary receptacle including a bottom wall, said bottom wall being spaced below said rear bumper member and having a forward edge disposed at the lower ends of said legs, said legs each having a rearward extension underlying said bottom wall of said secondary receptacle, the upper ends of said legs being connected by a transverse bight portion above said rear bumper member.

3. The apparatus of claim 2 in which said legs, bight portion, extensions and rear bumper member are of steel rod and said walls of said secondary receptacle are of wire mesh.

4. The apparatus of claim 2 in which said upstanding members comprise a pair of transversely spaced rear upstanding members and a pair of transversely spaced forward upstanding members forwardly spaced from said rear upstanding members, said secondary receptacle having side walls inboard of said upstanding members and extending from said rear upstanding members beyond said forward upstanding members, said rear bumper member being fixed to the rear face of said rear upstanding members, and including a support rod fixed therebelow to the front face of said rear upstanding members and to the rear ends of said extensions, a generally U-shaped perimeter rod extending forwardly from said rear bumper member adjacent each end thereof along the top of said side walls to the front end of said secondary receptacle and transversely along said front end between and beyond intermediate portions of said legs for defining therewith the location of a front wall of said secondary receptacle.

5. The apparatus of claim 1 in which said forward bumper member further includes a pair of transversely spaced, substantially horizontal extensions respectively connecting to and extending rearwardly from the lower end of said upstanding legs and including transverse means spaced below said rear bumper member for fixing the rear ends of said extensions to said upstanding members of said cart.

6. The apparatus of claim 5 in which said front bumper member further includes a transverse bight extending between and connecting the upper ends of said legs above the rod of said rear bumper member, said bight, legs and extensions being integral and providing said front bumper member with an inverted, transversely disposed U-shape with ends bent rearwardly.

7. The apparatus of claim 6 in which said upstanding members of said cart comprise spaced forward and rearward pairs of upstanding cart members and said transverse means include transverse rods respectively spanning said pairs and fixed thereto below the level of said rear bumper member, said transverse rods being fixed to and supporting said extensions at spaced points thereon.

8. The apparatus of claim 7 including a substantially horizontal U-shaped brace having arms extending forwardly from said rear bumper member and a transverse central portion backing said legs intermediate the ends thereof.

9. The apparatus of claim 8 in which said front and rear bumper members, transverse rods, brace and upstanding members are fixedly welded together to define a rigid, unitary bumper system integrated with said cart.

10. The apparatus of claim 8 including a substantially rectalinear, open-top secondary receptacle and in which said front and rear bumper members support the front, bottom and rear walls of said secondary receptacle.

* * * * *